Jan. 13, 1931. W. C. UHRI, JR 1,788,500
SWIVEL JOINT FOR PLURAL CONDUITS
Filed Feb. 24, 1926 2 Sheets-Sheet 2

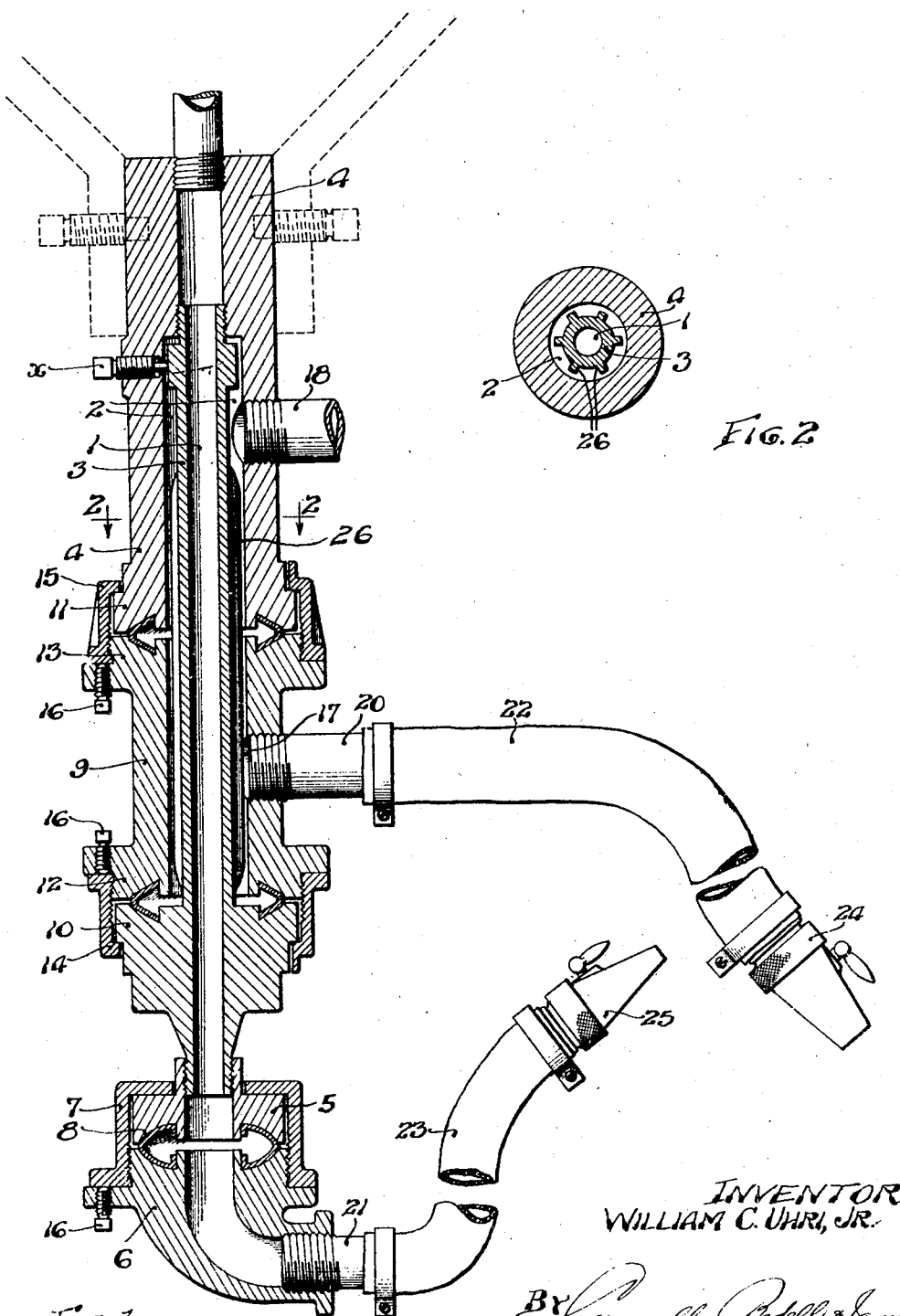

Inventor
WILLIAM C. UHRI, JR.

Patented Jan. 13, 1931

1,788,500

UNITED STATES PATENT OFFICE

WILLIAM C. UHRI, JR., OF CLAYTON, MISSOURI

SWIVEL JOINT FOR PLURAL CONDUITS

Application filed February 24, 1926. Serial No. 90,379.

My invention relates to fluid conduits and consists in an improved swivel coupling device whereby a plurality of conduits may be provided with extensions which may be swung at an angle about the stationary portion of the device.

A particular adaptation of my invention is for use in automobile washing plants in which it is desired to have water and compressed air brought to a fixture on the ceiling under which fixture an automobile may be run. The fixture may have lateral extensions to the outer ends of which one or more hose connections may be made to individual discharge nozzles or to a common discharge nozzle operated by the workman. The pivotal arrangement of the extensions are such that the nozzle or nozzles may be carried around the car in either direction without entangling of the hose and without restriction upon the continued movement of the workman about the machine. As the air and water must be brought to the discharge point in separate conduits, the problem created is the arrangement of separate conduits so that their extensions may be rotated as desired.

I attain the objects of my invention by utilizing the principles and structures illustrated in the accompanying drawings, in which—

Figure 1 is a vertical longitudinal section through the ceiling fixture with the ceiling fixture including the main portion of my swivel device and also illustrating the lateral extensions, hose, and nozzles used therewith.

Figure 2 is a transverse section taken on line 2—2 of Figure 1.

Figure 3:
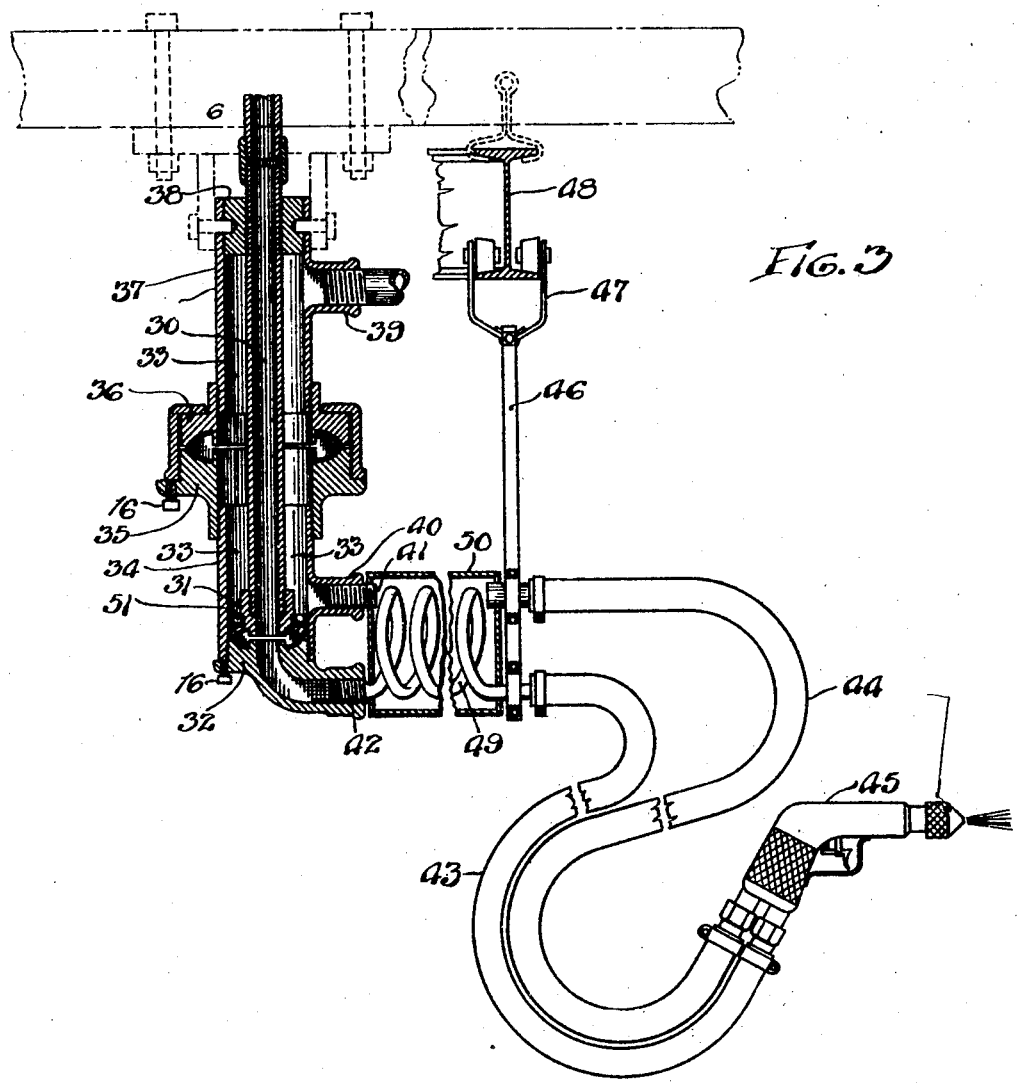
Figure 3 is similar to Figure 1 but shows a modified form of my invention.

Essentially my device comprises a central conduit for one fluid and one or more surrounding conduits for another fluid or fluids, each conduit having a fixed portion and a rotating portion, the fixed portions having separate inlet passages and the rotating portions having separate discharge passages.

In Figure 1 the central conduit is indicated at 1 and the outer conduit is indicated at 2, the central conduit being formed mainly by a pipelike member 3 extending axially of the device and having its ends threaded exteriorly. The inlet to conduit 1 is through a housing member 4 screwed on to the upper end of pipe 3 and projecting downwardly with its inner wall spaced from the outer wall of pipe 3 to form the upper portion of conduit 2. A screw X retains housing 4 in assembly with pipe 3. The lower end of pipe 3 has screwed thereon one part 5 of a swivel joint member, another part 6 of which is rotatable on part 5, the parts 5 and 6 being assembled by a nut 7 threaded onto part 6 and flanged to engage part 5. The joint between the two parts is sealed by means of a gasket or washer 8.

Below housing member 4 I provide a rotatable sleeve 9, the ends of which respectively form parts of other swiveling couplings similar to the coupling 5, 6, 7, 8 just described, suitable annular flanges 10 and 11 being provided on pipe 3 and housing 4 to cooperate with the flanges 12 and 13 on sleeve 9, and nuts 14 and 15 corresponding to nut 7 being similarly provided. Each nut 7, 14 and 15 is held in position on its respective member by a set screw 16.

By means of the joints illustrated each coupling may be adjusted independently of the others to secure a desired fit. Sleeve 9 may rotate freely on pipe 1 and housing 4 which form a stationary unit, and the lower swivel coupling element 6 may rotate freely on pipe 1.

Housing 4 has a lateral inlet opening 18 leading to conduit 2 and sleeve 9 has an outlet 17 leading from the conduit. Element 5 forms a swiveling outlet from conduit 1. Pipes 20 and 21 are shown as extending laterally from conduits 1 and 2 respectively and these pipes have individual hose 22 and 23 and discharge nozzles 24 and 25. While these pipes and nozzles are shown at the same side of the vertical conduits it will be understood that they may be rotated freely and independently of each other without entanglement or other limitations on their rotation.

In an automobile washing device the two conduits will be supplied with air and water respectively and frequently the water will be heated. It is desirable to heat the air also and passing the air through the central conduit 1 which is surrounded by the hot water in conduit 2 will effect an exchange of heat as desired. This exchange may be accelerated by providing pipe 1 with radial fins 26 throughout a portion of its length. Heating the air tends to increase its temperature and volume to the degree existing as it leaves the compressor and increases the force of the stream discharged from the air nozzle.

In the structure shown in Figure 3, the stationary portion of the device is indicated by a central pipe 30 terminatitng at its lower end in one member 31 of a swivel coupling, the other member 32 of which corresponds to member 6 of the structure shown in Figure 1. Member 32 also forms the bottom of the outer conduit 33. A channel like washer 51 seated in a groove in member 31 forms a seal against the passage of fluid from conduit 33 through the joint between members 31 and 32 into conduit 30.

A rotatable sleeve 34 carries at its upper end a swivel coupling member 35 which cooperates with a swivel coupling member 36 on the lower end of a stationary pipe 37 which is mounted on a collar 38 on pipe 30. The stationary pipe 37 has an inlet element 39 and the rotatable sleeve 34 has an outlet element 40. In this structure, the stationary parts are all assembled in one unit and the rotatable parts are all assembled in another unit.

Suitable lateral extensions 41 and 42 extend from the outlet elements of the inner and outer conduits and rotate together and a heat exchange arrangement is shown as consisting of a coil 49, for the air line, enclosed in a large pipe 50 through which the water passes. The outer end of pipe 50 is suspended by a link 46 from an overhead trolley 47 mounted on a circular track 48 fixed to the ceiling. Coil 49 and pipe 50 are provided with individual hose connections 43 and 44, respectively, to a common nozzle 45.

The heat exchange feature of this structure may be omitted if desired and various other modifications in the details and in the arrangement of my device may be made without departing from the spirit thereof expressed in my claims, and I contemplate the exclusive use of all such modifications as are included in the scope of my claims.

I claim:

1. A swivel device for a plurality of segregated fluid streams comprising noncommunicating conduits, one surrounding the other, individual elements swiveling independently of each other on said conduits and rotatable about the axis of both of said conduits, the element on the inner conduit being located at a different point axially of the conduits than the element on the outer conduit.

2. A swivel device for a plurality of segregated fluid streams comprising noncommunicating conduits, one surrounding the other, individual elements swiveling independently of each other on said conduits and rotatable about the axis of both of said conduits, the element on the inner conduit being located at a different point axially of the conduits than the element on the outer conduit, and lateral extensions on said elements directed transversely of said conduits.

3. A swivel device for a plurality of segregated fluid streams comprising a central stationary conduit, a swiveling coupling thereon in part aligned therewith and in part extending at an angle thereto, a noncommunicating stationary conduit surrounding said central conduit, and a swiveling coupling thereon in part aligned with said separate conduit and in part extending at an angle thereto.

4. A swivel device for a plurality of segregated fluid streams comprising a central conduit, an outer conduit surrounding but not communicating with said central conduit but shorter than said central conduit, axial inlet and outlet elements at the ends of said central conduit, and lateral inlet and outlet elements intermediate the ends of said outer conduit, said outlet elements being rotatable relative to said inlet elements.

5. A swivel device for a plurality of segregated fluid streams comprising a stationary member having spaced external flanges each having annular surfaces facing oppositely, a sleeve surrounding but not communicating with said member and extending between said flanges, a member detachably secured to each end of said sleeve and rotatably engaging the outer annular face of the adjacent flange, an outlet element on the side of said sleeve, and an outlet element on said stationary member rotatable thereon.

6. A vehicle washing equipment comprising a plurality of stationary overhead air and water supply conduits noncommunicating with each other, and lateral extensions on said conduits rotatable independently of each other in planes extending transversely of said stationary conduits.

7. A swivel device for a plurality of segregated fluid streams comprising noncommunicating conduits extending in one direction and provided with individual outlet elements, said elements being rotatable in planes extending transversely of the axis of one of said conduits, independently of each other.

8. A swivel device for a plurality of segregated fluid streams comprising noncommunicating conduits extending in one direction and one surrounding the other and each provided with an individual outlet element, said elements being rotatable in planes extending transversely of the axis of said conduits as a unit or irrespective of each other.

9. In a plural conduit swivel device a stationary member comprising a central pipe and a housing surrounding said pipe for a portion of the length of the latter but not communicating therewith, a sleeve surrounding said pipe and forming a rotatable extension of said housing, an axially adjustable coupling between said sleeve and housing, a closure for the lower end of said sleeve, and inlet and outlet elements for said housing and sleeve respectively.

10. In a plural conduit swivel device a stationary member comprising a central pipe, a rotatable extension on said pipe, an axially adjustable coupling between said pipe and extensions, and a housing surrounding said pipe for a portion of the length of the latter but not communicating therewith, a sleeve surrounding said pipe and forming a rotatable extension of said housing, an axially adjustable coupling between said sleeve and housing, a closure for the lower end of said sleeve, and inlet and outlet elements for said housing and sleeve respectively.

In testimony whereof I hereunto affix my signature this 4th day of February, 1926.

WM. C. UHRI, Jr.